United States Patent Office 3,313,650
Patented Apr. 11, 1967

3,313,650
COATING COMPOSITION AND PROCESS
FOR APPLYING THE SAME
Arthur E. Raeuber, Greenville, S.C., Edgar A. Verchot, Decatur, Ala., and Stanley E. Mileski, Augusta, Ga., assignors to Southern Research Institute, a corporation of Alabama
No Drawing. Filed Oct. 21, 1963, Ser. No. 317,765
10 Claims. (Cl. 117—127)

This invention relates to a coating composition and the process for applying the same and more particularly to the process for applying protective coatings to metals, such as aluminum and steel and alloys thereof.

An object of our invention is to provide a process for applying protective coatings to metals in which the coating is applied by conventional painting techniques.

Another object of our invention is to provide a protective coating for metals which cures without heating or baking and one which provides substantial protection against corrosion of the metal at temperatures in the range of 1000° F.

Another object of our invention is to provide a coating for metals and a process for applying the same of the character designated in which the coating is not only resistant to heat but is hard, well-bonded to the metal, and insoluble in water.

A further object of our invention is to provide a coating of the character designated which is smooth, and has good distensibility and resistance to thermal shock and exposure to weather.

A still further object of our invention is to provide a protective coating and process for applying the same in which the product is cured in air at normal temperatures, thereby eliminating the necessity of providing complicated equipment and elevated temperatures for curing the coating.

Heretofore in the art to which our invention relates, various processes and coating compositions for metals based on metal oxides and phosphates have been suggested. However, such processes and compositions have required the employment of heat to the fusion temperature of the composition to cure the coatings. Such compositions have been in the form of glasses or ceramics. Conventional paints, based on organic binders, are not stable at 1000° F. While some organic paints based on silicones have been claimed to offer some protection at such elevated temperatures, these paints require curing at elevated temperatures.

In accordance with our present invention, we have devised a coating composition from metal oxides and alkyl phosphorus compounds that cures without heating to form coatings that are both water resistant and heat resistant. The curing of the coating composition may be accelerated by employing an acidic phosphorus compound, and the product may be further modified by employing an aqueous suspension of a hydrophilic material. The reaction of the alkyl phosphorus compounds with the metal oxide in the coating is controlled by dampening the coating with water during the initial period of curing. Also, the reaction may be controlled by control of temperature and available moisture from the atmosphere.

In carrying out our process, we mix approximately 10 parts by weight of a metal oxide, such as zinc oxide, magnesium oxide and bismuth oxide with approximately 10 to 14 parts by weight of a dialkyl phosphite, such as dimethyl hydrogen phosphite, diethyl hydrogen phosphite, dipropyl hydrogen phosphite, dibutyl hydrogen phosphite and bis (2-ethylhexyl) hydrogen phosphite. Instead of employing a single metal oxide in the mixture, a mixture of selected metal oxides may be employed whereby the mixture would contain one, two or more of the metal oxides. Also, mixtures of the dialkyl phosphites may be employed instead of a single dialkyl phosphite. In actual practice, we find that mixing the metal oxide and the dialkyl phosphite for approximately 45 to 90 seconds is sufficient.

Since the metal oxide and the dialkyl hydrogen phosphite react very slowly, it is desirable to accelerate the reaction by employing a promoter, such as an acidic phosphorus compound or an aqueous suspension of a hydrophilic material. Water may also be employed, but the resulting coating would tend to have less heat resistance. Preferably, we employ monoethyl acid phosphate, diethyl acid phosphate and mixtures thereof as the acidic phosphorus compound. We have found that colloidal silica (sold under the trade name "Ludox LS"), hydrated alumina (sold under the trade name "Baymal") and a pyrogenic silica (sold under the trade name "Cab-O-Sil") form suitable hydrophilic materials.

In actual practice, we have found that approximately 1 to 2 parts by weight of ethyl acid phosphate for each 10 parts by weight of metal oxide employed is satisfactory in every respect to accelerate the reaction. Where water is employed to accelerate the reaction, we employ from 1 to 4 parts by weight of water for each 10 parts by weight of metal oxide employed. Also, where the aqueous suspension of a hydrophilic material is employed, we employ from 1 to 2 parts by weight of the aqueous suspension for each 10 parts by weight of metal oxide employed.

To any of the above mentioned compositions, we preferably add from 3 to 6 parts by weight of toluene for each 10 parts by weight of the metal oxide employed. The toluene serves as a diluent to delay thickening of the paint composition and to facilitate its application as a thin film on the metal surface.

After preparation of the coating composition, it is applied to a clean metal surface, such as aluminum, steel or alloys thereof by suitable means, such as brushing or with a conventional spray gun. To develop a coating which is both heat resistant and water resistant, the coating is exposed to an initial curing period of approximately 90 minutes wherein the temperature and relative humidity are controlled or the coating is dampened at intervals to maintain it in a damp condition for approximately 90 minutes. A practical method of dampening the coating is to apply water in the form of a fog or spray. After this initial curing period, the coating is allowed to continue to cure under ambient conditions for a period of 24 to 48 hours before exposing the coating to extreme conditions of temperature or humidity.

It is believed that the coating composition is formed by a reaction between the metal oxide, such as zinc oxide, and the dialkyl hydrogen phosphite and is probably an amorphous polymer with the following structure:

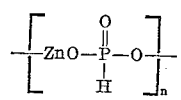

While we do not know just why the aqueous suspensions of the hydrophilic materials listed above are effective promoters and aid in producing coatings with exceptionally good heat and water resistance properties, the silica or alumina may form cross-linking bonds with the metal phosphate base polymer or may act as water retention agents, or perhaps perform both functions.

While we prefer to employ zinc oxide as the metal oxide, satisfactory coatings can be formed by employing oxides of magnesium and bismuth. Where bis (2-ethylhexyl) acid phosphite is employed as the dialkyl phosphite, a by-product in the form of 2-ethylhexanol is formed which requires a longer period of time for curing. In actual practice, we have found that the most satisfactory dialkyl phosphites are dimethyl hydrogen phosphite and diethyl hydrogen phosphite.

In order that those skilled in the art may better understand how the present invention can be carried into effect, the following examples are given by way of illustration and not by way of limitation. All parts are by weight unless otherwise stated.

*Example I*

A coating composition of 10 parts of zinc oxide, 12 parts of dimethyl hydrogen phosphite and 1 part of a mixture of monoethyl dihydrogen phosphate and diethyl hydrogen phosphate was mixed in a Waring Blendor for 45–90 seconds. The mixture was then painted onto an aluminum panel which had been previously cleaned by sanding and rinsing with acetone. The coating was kept damp by spraying at intervals with a fine mist of water for an initial period of approximately 90 minutes. The coating was then allowed to cure for 24 hours at 100° F. and 50% relative humidity. The coated panel was then heated to 1000° F. for 5 minutes and then rinsed in cold water without damage to the coating. The coating was hard and well-bonded to the metal.

*Example II*

Aluminum panels were coated with a mixture similar to that of Example I wherein 12 parts of bis (2-ethylhexyl) hydrogen phosphite was employed instead of the dimethyl hydrogen phosphite. While these coatings were still tacky after curing for one week, they were heat resistant and water resistant.

*Example III*

Mixtures were prepared containing 10 parts of zinc oxide, 12 parts of dimethyl hydrogen phosphite and 1 part of selected ones of the following: ethyl acid phosphate, water, 35% aqueous colloidal silica (Ludox LS), and a 33% suspension of hydrated alumina (Baymal, colloidal boehmite fibrils of the composition AlOOH). Aluminum panels were painted with the mixtures and the coatings were cured for 2 hours at 72° F. and 75% relative humidity, and then cured for at least 22 hours at ambient conditions. On examination, it was found that all of the coatings were hard, well bonded to the metal, and resistant to elevated temperatures, most of the coatings being resistant to heating at 1000° F. Coatings containing aqueous colloidal silica and hydrated alumina appeared to be more resistant to heat and water than were the remainder of the coatings.

*Example IV*

A mixture of 10 parts of zinc oxide, 12 parts of dimethyl hydrogen phosphite, 1 part of colloidal silica (Ludox LS) and 3 parts of toluene was prepared and applied to a clean aluminum panel with a spray gun. The coating was cured at 72° F. and 75% relative humidity for 24 hours. The coating was both heat resistant and water resistant and was smooth, hard, and well-bonded to the metal.

*Example V*

A coating composition was prepared by mixing 10 parts of zinc oxide, 12 parts of dimethyl hydrogen phosphite and 1 part of colloidal alumina (Ludox LS). The composition was applied to aluminum panels and was kept damp for 90 minutes by spraying at intervals with a fine mist of water. Then it was allowed to cure at ambient conditions for 24 hours. The cured coatings were hard, smooth, well bonded and both heat and water resistant. These coated panels were repeatedly heated to 1000° F. and immediately quenched in water. After being heated and quenched 30 times, there was no evidence of chipping, flaking, or loss of adhesion of the coatings to the metal.

*Example VI*

The procedure of Example V was followed except that the coating composition consisted of 10 parts of zinc oxide, 12 parts of dimethyl hydrogen phosphite and 1 part of ethyl acid phosphate. The coatings were hard, smooth, well-bonded and both heat resistant and water resistant.

*Example VII*

Aluminum panels were coated according to the procedure of Example V. The coated panels were exposed to salt spray in a corrosion resistance test for 150 hours. After exposure, the coatings were still smooth, hard, well-bonded, heat resistant and water resistant, and showed no visible signs of corrosion. The electrical resistance of the coating was determined to be $2.9 \times 10^9$ ohms/in.$^2$/mil.

The dielectric strength of the coating was approximately 125 volts/mil. The coating was not attacked by common organic solvents. Exposure to accelerated weathering in a Weatherometer for 300 hours did not produce any visible signs of deterioration in the coating.

*Example VIII*

The procedure of Example IV was followed except that the coating was applied to a clean steel panel instead of an aluminum panel.

*Example IX*

The procedure of Example V was followed except that the coating was applied to a clean steel panel instead of an aluminum panel.

From the foregoing, it will be seen that we have devised an improved coating for metal surfaces and the process of producing the same. By providing a coating composition from metal oxides and alkyl phosphorus compounds which will cure without heating, we greatly simplify the application and curing of the coatings on metal surfaces. Also, by providing coatings which are water resistant and heat resistant up to 1000° F., our improved coatings are particularly adapted for use on aluminum or steel surfaces which are subjected to elevated temperatures. Furthermore, by providing a heat resistant and water resistant coating which may be applied and cured by merely controlling the reaction by spraying with water to keep the surface damp during the early stages of the cure, our improved process is extremely simple to carry out with a minimum of effort.

We wish it to be understood that we do not desire to be limited to the precise examples, proportions of embodiments herein disclosed for obvious modifications will occur to a person skilled in the art.

What we claim is:

1. The process of coating a metal surface selected from the group consisting of iron, aluminum and alloys thereof comprising:
    (a) applying to said surface a coat of a mixture comprising approximately 10 parts by weight of a metal oxide selected from the group consisting of zinc oxide, magnesium oxide, bismuth oxide and mixtures thereof and from 10 to 14 parts by weight of a dialkyl phosphite selected from the group consisting of dimethyl hydrogen phosphite, diethyl hydrogen phosphite, dipropyl hydrogen phosphite, dibutyl hydrogen phosphite, bis (2-ethylhexyl) hydrogen phosphite and mixtures thereof,
    (b) initially curing said coat in a damp condition for a period of from 90 minutes to 2 hours at ambient temperature, and then
    (c) curing said coat on said surface for a period of 24 to 48 hours at ambient temperature.

2. The process of coating a metal surface as defined in claim 1 in which an acidic phosphorus compound selected from the group consisting of monoethyl acid phosphate, diethyl acid phosphate and mixtures thereof is added to said mixture prior to applying the same to said surface to accelerate the curing reaction.

3. The process of coating a metal surface as defined in claim 1 in which an aqueous suspension of hydrophilic material selected from the group consisting of colloidal silica, hydrated alumina, a pyrogenic silica, and mixtures thereof is added to said mixture prior to applying the same to said surface.

4. The process of coating a metal surface as defined in claim 1 in which said coat is dampened with water during the initial curing for approximately 90 minutes after being applied to said surface.

5. The process of coating a metal surface as defined in claim 4 in which the coat is dampened by spraying water thereon.

6. A coating composition adapted to be applied to a metal surface selected from the group consisting of iron, aluminum and alloys thereof and which cures in a damp condition without heating comprising:
 (a) 10 parts by weight of a metal oxide selected from the group consisting of zinc oxide, magnesium oxide, bismuth oxide and mixtures thereof, and
 (b) from approximately 10 to 14 parts by weight of a dialkyl phosphite selected from the group consisting of dimethyl hydrogen phosphite, diethyl hydrogen phosphite, dipropyl hydrogen phosphite, dibutyl hydrogen phosphite, bis (2-ethylhexyl) hydrogen phosphite and mixtures thereof.

7. A coating composition as defined in claim 6 in which an acidic phosphorus compound selected from the group consisting of monoethyl acid phosphate, diethyl acid phosphate and mixtures thereof is added thereto.

8. A coating composition as defined in claim 6 in which an aqueous suspension of a hydrophilic material selected from the group consisting of colloidal silica, hydrated alumina, a pyrogenic silica and mixtures thereof is added thereto.

9. A coating composition as defined in claim 6 in which from approximately 3 to 6 parts by weight toluene is added thereto as a diluent.

10. A composition as defined in claim 6 in which from approximately 1 to 2 parts by weight ethyl acid phosphate is added thereto.

References Cited by the Examiner
UNITED STATES PATENTS

| | | | |
|---|---|---|---|
| 2,080,299 | 5/1937 | Benning et al. | 106—14 X |
| 2,084,270 | 6/1937 | Shoemaker | 252—49.8 |
| 2,224,695 | 12/1940 | Prutton | 148—6.15 |
| 3,104,993 | 9/1963 | Sievert et al. | 148—6.15 |

ALFRED L. LEAVITT, *Primary Examiner.*

J. R. BATTEN, JR., *Assistant Examiner.*